US011485868B2

(12) United States Patent
Illsley et al.

(10) Patent No.: US 11,485,868 B2
(45) Date of Patent: Nov. 1, 2022

(54) COMPOSITE AQUEOUS INKJET FLUIDS

(71) Applicant: SUN CHEMICAL CORPORATION, Parsippany, NJ (US)

(72) Inventors: Derek Ronald Illsley, Bath Somerset (GB); Valerie Elizabeth Moss, Street (GB); Donna Mateer, Bath Somerset (GB)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 17/422,588

(22) PCT Filed: Mar. 6, 2020

(86) PCT No.: PCT/GB2020/050551
§ 371 (c)(1),
(2) Date: Jul. 13, 2021

(87) PCT Pub. No.: WO2020/183139
PCT Pub. Date: Sep. 17, 2020

(65) Prior Publication Data
US 2022/0041874 A1 Feb. 10, 2022

Related U.S. Application Data

(60) Provisional application No. 62/817,017, filed on Mar. 12, 2019.

(51) Int. Cl.
| | | |
|---|---|---|
| C08F 2/46 | (2006.01) | |
| C08F 2/50 | (2006.01) | |
| C09D 11/102 | (2014.01) | |
| B41J 2/005 | (2006.01) | |
| C08K 3/36 | (2006.01) | |
| C08L 25/14 | (2006.01) | |
| C08L 75/04 | (2006.01) | |
| C09D 11/033 | (2014.01) | |
| C09D 11/107 | (2014.01) | |
| C09D 11/38 | (2014.01) | |

(52) U.S. Cl.
CPC ............ *C09D 11/102* (2013.01); *B41J 2/005* (2013.01); *C08K 3/36* (2013.01); *C08L 25/14* (2013.01); *C08L 75/04* (2013.01); *C09D 11/033* (2013.01); *C09D 11/107* (2013.01); *C09D 11/38* (2013.01); *C08K 2201/011* (2013.01); *C08L 2201/54* (2013.01)

(58) Field of Classification Search
CPC ......... B33Y 70/00; G03F 7/027; G03F 7/038; G03F 7/0042; G03F 7/0037; C09D 7/65; C09D 163/10; B29K 2063/00; B29K 2105/0091; B29K 2033/08; B29C 64/124
USPC ............................................ 522/3, 1; 520/1
See application file for complete search history.

(56) References Cited

U.S. PATENT DOCUMENTS

| | | | |
|---|---|---|---|
| 7,338,988 | B2 | 3/2008 | Hesler |
| 7,354,476 | B2 | 4/2008 | Beach |
| 7,638,561 | B2 | 12/2009 | Fu |
| 8,430,493 | B2 | 4/2013 | Matsumoto |
| 8,931,889 | B2 | 1/2015 | Roberts |
| 9,090,734 | B2 | 7/2015 | Kraiter |
| 2005/0182154 | A1 | 8/2005 | Berge |
| 2007/0060670 | A1 | 3/2007 | Ellis |
| 2013/0066006 | A1 | 3/2013 | Miyajima |
| 2016/0102220 | A1 | 4/2016 | Kido et al. |
| 2017/0267886 | A1 | 9/2017 | Anton |
| 2018/0051182 | A1 | 2/2018 | Lussier |
| 2018/0105710 | A1 | 4/2018 | Hong |
| 2018/0237987 | A1 | 8/2018 | Urano et al. |

FOREIGN PATENT DOCUMENTS

| | | | |
|---|---|---|---|
| EP | 2558541 | | 9/2013 |
| JP | 2009-509005 | A | 3/2009 |
| JP | 2011074321 | * | 4/2011 |
| JP | 2015093954 | | 9/2017 |
| JP | 2017-226790 | A | 12/2017 |
| JP | 2018-135445 | A | 8/2018 |
| JP | 2019-163442 | A | 9/2019 |
| WO | WO 2012/173032 | | 12/2012 |
| WO | WO 2016092309 | | 6/2016 |
| WO | WO 2016/132858 | | 8/2016 |
| WO | WO 2017/125353 | | 7/2017 |

OTHER PUBLICATIONS

Oki et al, JP 2011-074321 Machine Translation, Apr. 14, 2011 (Year: 2011).*
Written Opinion of the International Searching Authority issued in International Application No. PCT/GB2020/050551, dated May 26, 2020.
International Search Report issued in International Application No. PCT/GB2020/050551, dated May 26, 2020.
International Preliminary Report on Patentability (Chapter II of the Patent Cooperation Treaty) issued in International Application No. PCT/GB2020/050551, dated Jul. 5, 2021.
Japanese Office Action issued in counterpart JP application No. 2021-549169 dated Feb. 22, 2022 with English language translation thereof.

* cited by examiner (Continued)

*Primary Examiner* — Jessica Whiteley
(74) *Attorney, Agent, or Firm* — Marian E. Fundytus; Ostrolenk Faber LLP

(57) ABSTRACT

Aqueous inkjet compositions comprising a composite resin vehicle wherein at least one component of the composite resin vehicle is a polyurethane dispersion (PUD) preferably with a glass transition temperature (Tg) of less than 80° C., and the other component is an acrylic resin dispersion preferably with a Tg of greater than 40° C. or a metal oxide nanoparticle dispersion such as colloidal silica with a particle size of less than 100 nm.

28 Claims, No Drawings

COMPOSITE AQUEOUS INKJET FLUIDS

CROSS REFERENCE TO RELATED APPLICATIONS

The present application is a § 371 National Phase application based on PCT/GB2020/050551 filed Mar. 6, 2020, which claims the benefit of U.S. Provisional Application No. 62/817,017 the subject matter of each of which is incorporated by reference in their entirety.

The present invention relates to aqueous inkjet compositions that have improved rub and block resistance.

BACKGROUND

The use of PUDs (polyurethane dispersions) in aqueous inkjet compositions is well known. US2017/0267886 describes ink compositions comprising low concentrations of PUDs (or acrylic emulsions). U.S. Pat. No. 9,090,734 discloses inkjet compositions comprising PUDs having Tg's (glass transition temperature) of between −30-35° C. It does not disclose the benefits accruing from suitable blends of PUDs and acrylic emulsions. WO2012173032 describes PUD-based inkjet compositions suitable for laminatable printed food packaging. WO2016132858 discloses aqueous inkjet compositions comprising resin dispersions, which include PUDs, where the particle size of the resin dispersion is less than that of the pigment dispersion.

To improve the resistance of aqueous inkjet compositions comprising PUDs, a number of approaches have been taken. U.S. Pat. No. 8,931,889 describes the use of hydroxy-functional PUDs to produce aqueous inkjet compositions having improved fastness and smudge resistance. US2018/0105710 discloses how the resistance properties of a hydroxy-functional PUD comprising aqueous inkjet composition can be improved by the inclusion of a suitable crosslinker that would react with the hydroxy groups of the PUD. WO2017125353 describes inks containing crosslinkable PUDs bearing blocked isocyanate groups. Crosslinked PUDs to deliver improved resistance properties have been widely disclosed; US20050182154, US20070060670 and US20170267886 being specific instances. EP2558541 describes how hybrid resin dispersion particles, where a PUD is used as a 'core' for an emulsion polymerization of (meth)acrylate monomers, to enable improved resistance properties of a printed inkjet composition.

Aqueous inkjet compositions comprising (meth)acrylic dispersions are also well known. U.S. Pat. Nos. 7,338,988, 7,638,561, 7,354,476 describe aqueous inkjet compositions comprising acrylic dispersions having Tgs in the range −40-150° C. U.S. Pat. No. 7,638,561 and JP2015093954 describe the use of core-shell acrylic dispersions. The combination of discrete acrylic and polyurethane dispersions is not revealed. U.S. Pat. No. 8,430,493 describes the combination of self-dispersing acrylic resins and colloidal silicas.

As is evident from the foregoing discussion, enhancements to the performance of PUD comprising inkjet compositions via the combination with suitable high Tg acrylic dispersions or dispersions of nanoscale (less than 100 nm particle size) metal oxide particles, including silica, has not been described.

SUMMARY OF THE INVENTION

The present invention provides aqueous inkjet compositions comprising a composite resin vehicle, wherein the composite resin vehicle comprises an aqueous thermoplastic polyurethane dispersion and one or more second aqueous dispersion(s), wherein the one or more second aqueous dispersion(s) are selected from the group consisting of a styrene-(meth)acrylic resin dispersion, a metal oxide nanoparticle dispersion, or a combination thereof. The metal oxide nanoparticle dispersion can be colloidal silica dispersion or alumina dispersion.

The present invention describes aqueous inkjet compositions comprising a composite resin vehicle wherein at least one component of the composite resin vehicle is a polyurethane dispersion (PUD) preferably with a glass transition temperature (Tg) of less than 80° C., and the other component is a styrene-(meth)acrylic resin dispersion, such as an acrylic resin dispersion, preferably with a Tg of greater than 40° C., or a metal oxide nanoparticle dispersion, such as colloidal silica, with a particle size of less than 100 nm.

It is preferred that the second component of the vehicle package (also referred to as the composite resin vehicle), whether it be a styrene-(meth)acrylic resin dispersion such as an acrylic latex, colloidal silica, or other metal oxide nanoparticle dispersion, does not film form at the temperature of application. In this respect it is especially preferred that the Tg of any polymer dispersion of the second component should preferably be greater than 60° C. The invention overcomes issues associated with the use of non-crosslinked thermoplastic PUDs, especially their tendency to block.

The inventors have found that aqueous inkjet compositions comprised solely of polyurethane dispersions (PUDs) are prone to blocking. Blocking is a term well known to those skilled in the art and denotes the tendency of a printed ink surface when brought into contact with other surfaces, including the reverse side of the printed substrate ('face-to-back'), printed ink surface ('face-to-face') or with other surfaces to suffer ink transfer to the contacting surface, with consequent loss of print quality. By blending PUDs with a styrene-(meth)acrylic resin dispersion, such as an acrylic emulsion, of sufficiently high Tg, or with a colloidal silica (or other nanoscale aqueous metal oxide particle dispersion), the blocking issues are mitigated. Other benefits observed with this approach are improvements in abrasion and scratch resistance. The use of PUDs is useful in a number of inkjet applications, including but not limited to; the printing of graphics, printing of packaging materials (including food packaging), textiles printing and décor printing due to their flexibility, adhesion and chemical resistance properties.

The inventors have also found that when properly formulated, aqueous inkjet compositions comprising PUDs have excellent resolubility, which is the capacity of the ink to re-dissolve after partial or indeed complete drying of the ink. This is an important aspect for inkjet printing as it helps ensure reliable jetting performance without the risk of a drying ink irreversibly blocking the nozzles of a printhead. Contrariwise, the inventors have found that aqueous inkjet compositions based solely on acrylic dispersions have significantly poorer resolubility characteristics compared with those inks based on PUDs although having superior block resistance characteristics, especially those acrylic dispersions having Tgs of greater than 30° C., more preferably greater than 40° C. and even more preferably greater than 60° C. By the appropriate blending of PUDs with styrene-(meth)acrylic resin dispersions such as acrylic dispersions the inventors have been able to formulate inks which successfully marry the performance attributes of PUDs and acrylic dispersions. These improvements are likely to arise from a composite resin matrix, with segregated domains of the two, or more, resin components in the final dried ink.

Similarly, the inventors have found that similar property enhancements can be obtained by the preparation of organic-inorganic nanocomposites via the blending of PUDs with nanoscale (less than 100 nm particle size) metal oxide dispersions, preferably colloidal silicas. Thus, the invention covers both organic-organic (polymer) composites and organic-inorganic composites to provide the required blocking resistance for PUD-containing aqueous inkjet compositions.

The suitable blending of commercially available thermoplastic PUDs with commercially available styrene-(meth) acrylic resin dispersion such as acrylic dispersions having Tgs of greater than 30° C. can deliver aqueous inkjet compositions with improved resistance properties and especially improved block resistance. The prior art achieves improvements in rub and block resistance through the use of crosslinkers, the synthesis of crosslinked PUDs or by the synthesis of hybrid polyurethane-acrylic dispersions. The use of crosslinkers runs the risk of a drying ink crosslinking in the nozzles of a printhead of an inkjet printing press, whether that be a multipass or single pass press, running the considerable risk of the printhead becoming irretrievably blocked. The use of crosslinked PUDs, obtained by the use of polyvalent reagents during the polyurethane synthesis (for example a trifunctional isocyanate precursor) although improving the resistance properties of any ink could result in poorer film forming properties compared with a non-crosslinked thermoplastic PUD, as a consequence of poorer coalescence resulting from the crosslinked structure. The use of hybrid PU-acrylic particle dispersions is an approach in combining the properties of a PU and acrylic, but the simple blending of polymer dispersions as described by the current invention is likely to be a more versatile and controllable approach using as it uses commercially available materials.

The benefits observed with inkjet inks prepared according to the current invention from multipass press produced prints on coated paper stock are described below. Compared with commercially available inks, inks prepared according to the invention not only produce prints of superior rub and block resistance, but the prints are also of superior resolution and higher gloss.

Compared with the prior art, where improved print resistance of PUD-based inks has been achieved via the use of pre-crosslinked PUDs, the addition of crosslinkers or by PU-acrylic hybrid resin dispersions, inks prepared according to the current invention achieve improved block and rub resistance by the use of conventional, thermoplastic PUDs in combination with styrene-(meth)acrylic resin dispersions, or a metal oxide nanoparticle dispersion, such as colloidal silica. The benefits of the current approach are several-fold. Firstly, inkjet compositions prepared according to the invention can be prepared using commercially available PUDs, styrene-(meth)acrylic resin dispersions and colloidal silicas (or other metal oxide particle dispersions). Secondly, since thermoplastic (non-crosslinked) PUDs are used it is likely that film formation of inks prepared according to the current invention will not be compromised. Thirdly, no crosslinking agent (such as a polycarbodiimide) is required since the use of a suitable styrene-(meth)acrylic resin dispersion (such as an acrylic dispersion) or metal oxide nanoparticle dispersion in combination with the PUD will deliver the desired improvements in block and abrasion resistance. Furthermore, inks of the current invention have excellent resolubility, an attribute that would surely be compromised by any degree of crosslinking in a drying or dried ink. Crosslinking in a drying ink would run the risk of irreversibly blocking the nozzles of a printhead causing at best loss of print quality as a result of the blocking of a few printhead nozzles to total loss of a printhead due to extensive drying and curing of the ink in the printhead nozzles. As will be appreciated, either of these two events is highly undesirable and inks prepared according to the current invention through the use of a composite resin vehicle comprising non-crosslinked PUDs avoids these events.

To the best of the inventors' knowledge, inkjet compositions prepared according to the current invention have not been previously described in the prior art. Furthermore, the specific industrial inkjet printing applications using inkjet compositions of the current invention; including but not limited to graphics printing, packaging and food packaging printing, label printing, textiles printing and décor printing have not been described by the prior art. The reinforcement that can be induced into prints prepared with inkjet compositions of the current invention comprising a PUD composite vehicle especially of PUD composites with styrene-(meth) acrylic resin dispersions, of sufficiently high Tg is significant and not anticipated by the prior art. It is not only the improvement to print properties such as the block resistance and rub resistance which is a most useful attribute of the present invention, it is also the maintenance of a high degree of ink resolubility, which enables this new inkjet technology provided by the current invention to deliver a truly workable inkjet solution. Ink resolubility of any aqueous inkjet composition is a key attribute as it allows for sustainable jetting performance from a printhead and furthermore, in the worst case of a dried ink, will allow the printhead to be recovered by flushing through with the ink or suitable flushing fluid.

The inkjet compositions of the present invention advantageously produce a dense film on coated offset paper with high contrast between light and dark areas of print without having to increase the film weight. As such, the inkjet compositions according to the present invention can advantageously be used in the printing of posters on translucent paper. The printed posters can then be illuminated from behind since the inkjet compositions of the present invention avoid the tendency of other poster inks to suffer from poor color density when the printed surface is illuminated from behind.

The prior art has not adequately disclosed how aqueous inkjet compositions comprising thermoplastic PUDs with Tgs of less than 80° C. can be enhanced by blending with high Tg styrene-(meth)acrylic dispersions, or/and metal oxide nanoparticle dispersions. It is preferable that styrene-(meth)acrylic resin dispersions, having Tgs of greater than 30° C., preferably greater than 40° C. and most preferably greater than 60° C. are used to provide the required print performance improvements

DETAILED DESCRIPTION OF THE INVENTION

According to the present invention, there is provided an aqueous inkjet composition comprising a composite resin vehicle, wherein the composite resin vehicle comprises an aqueous thermoplastic polyurethane dispersion and one or more second aqueous dispersion(s), wherein the one or more second aqueous dispersion(s) are selected from the group consisting of a styrene-(meth)acrylic resin, a metal oxide nanoparticle dispersion, or a combination thereof. The present invention also provides an aqueous inkjet composition or fluid comprising a composite resin vehicle wherein the composite resin vehicle consists of a blend of a thermoplastic polyurethane dispersion and a second particle dispersion.

The polyurethane dispersion of the composite resin component (i.e. the composite resin vehicle) preferably has a glass transition temperature of less than 80° C. and may be anionic or non-ionic in nature. The second particle dispersion of the resin component may be in one instance a styrene-(meth)acrylic resin dispersion with a Tg most preferably greater than 60° C. Where the second particle dispersion is a styrene-(meth)acrylic resin dispersion it may be homophasic or a core-shell latex where one or more of the polymer phases preferably has a Tg of greater than 60° C. In a second instance the second particle dispersion of the composite resin vehicle may be a metal oxide nanoparticle dispersion, preferably a colloidal silica. The metal oxide nanoparticle dispersion may also be alumina.

The composite resin vehicle of the invention provides inks which when printed have improved rub and block resistance compared with inks comprising solely a polyurethane dispersion.

In a further aspect of the invention, the PUD may have a hydroxy value of 10 mgKOH, or greater. In yet a further aspect of the invention the PUD may have an average molecular weight of 100,000 or less.

The inkjet compositions of the invention are suitable for the printing of graphics images, the printing of packaging, including food packaging, the printing of textiles and décor printing.

The inkjet compositions of the present invention advantageously produce a dense film on coated offset paper with high contrast between light and dark areas of print, without having to increase the film weight beyond that which is used by market competitors.

The inkjet compositions of the invention are also suitable for printing on translucent paper stock. Accordingly, the inkjet compositions of the present invention can be used in the printing of posters on translucent paper. The printed poster can then be illuminated from behind.

The invention aims to address one of the issues often associated with the use of thermoplastic polyurethane dispersions in aqueous inkjet compositions, especially those with glass transition temperatures of less than 80° C., especially those with Tgs of less than 40° C. and most especially those with Tgs of less than 20° C., namely their tendency to produce prints of poor block and abrasion/scratch resistance. PUDs are a useful resin dispersion for the preparation of aqueous inkjet compositions as they provide a range of desirable properties in prints, including flexibility and adhesion and when carefully selected PUDs can be incorporated into inkjet compositions having excellent resolubility. Resolubility is the ability of a drying, or dried, ink to re-dissolve either in itself or a suitable flushing agent. If an ink was to dry irreversibly in the nozzles of a printhead then this would cause either a portion of missing nozzles resulting in white lines in any print, or total blockage and loss of the printhead, which is a catastrophic and expensive outcome. The inventors have found that PUDs, when carefully selected and formulated, have excellent resolubility whereas styrene-(meth)acrylic resin dispersions tend to have poorer resolubility.

By blending PUDs and styrene-(meth)acrylic resin dispersions, having Tgs of greater than 40° C. and more preferably greater than 60° C., according to the principals outlined above, the aqueous inkjet compositions combining the desired features of both can be prepared—i.e. adhesion, flexibility and resolubility of the PUD and the toughening resulting in improved block and abrasion resistance conferred by the styrene-(meth)acrylic resin dispersion. It should be noted that the styrene-(meth)acrylic resin dispersions as described would not tend to be film-forming due to their high Tg. It will be appreciated by those skilled in the art that the outcome of using this composite resin vehicle is highly desirable and would be beneficial in a range of industrial inkjet printing applications; including graphics printing, packaging and food packaging printing, textiles printing and décor printing. It is also suitable for printing of posters on translucent paper stock which are then illuminated from behind.

Thus, the inventors have found that high Tg, essentially non-film forming, styrene-(meth)acrylic dispersions improved the abrasion and block resistance of thermoplastic PUD-containing aqueous inkjet compositions. Similarly, metal oxide nanoparticle dispersions such as colloidal silica or alumina dispersions do not film-form and form a nanocomposite organic-inorganic composite with the PUD of the inventive inkjet composition. In the case of the use of high Tg styrene-(meth)acrylic resin dispersions the inventors postulate that a heterophasic (organic-organic) resin composite is formed in the dried ink which provides the performance enhancement in respect of the block and abrasion resistance. It is the likely formation of these organic-organic, or organic-inorganic composites in the case of metal oxide nanoparticle dispersions, which deliver the observed reinforced properties of the aqueous inkjet compositions of the current invention.

Definitions and Scope

PUD (Polyurethane dispersion). In the context of the current invention both anionically and non-ionically stabilized PUDs may be used. It is preferable that the PUDs have an average particle size of less than 200 nm and more preferably less than 100 nm. Furthermore, the PUD may be synthesized from any blend of polyol precursors including, but not limited to; polyether diols, polyester diols, polyacrylic diols and polycarbonate diols or hybrids thereof. It is preferred that the PUDs used in the invention have Tgs of less than 80° C. PUDs with Tgs of less than 40° C. and those with Tgs of less than 20° C. are also encompassed by the invention; the requirement being that the inks comprising any blend of PUDs should be sufficiently flexible. Thermoplastic PUDs are encompassed by the invention, which are those PUDs which are essentially linear in structure with minimal crosslinking.

Tg (glass transition temperature). Tg is measured by differential scanning calorimetry (DSC). Preferably, measurements were made according to the following standard test method and based on the method described in ASTM E1356-98. The sample was maintained under an atmosphere of dry nitrogen for the duration of the scan. A flow rate of 20 ml/min and Al pans were used. Samples (5 mg) were heated at 20° C./min from 20° C. to 350° C. The value of a Tg was determined as the extrapolated onset temperature of the glass transition observed on the DSC scans (heat flow (W/g) against temperature (° C.)), as described in ASTM E1356-98.

Average molecular weight. Unless otherwise stated, a reference to "molecular weight" or "average molecular weight" is a reference to the number average molecular weight (Mn). The molecular weight is suitably measured by techniques known in the art such as gel permeation chromatography. Preferably, molecular weight is measured by comparison with a polystyrene standard. For instance, molecular weight determination may be conducted on a Hewlett-Packard 1050 Series HPLC system equipped with two GPC Ultrastyragel columns, 103 and 104 Å (5 μm mixed, 300 mm×19 mm, Waters Millipore Corporation, Milford, Mass., USA) and THF as mobile phase. The skilled person will appreciate that this definition of molecular weight applies to polymeric materials which typically have a molecular weight distribution.

Particle size/average particle size. In the context of the present invention, the terms "particle size" or "average particle size" refer to the volume distributed median particle diameter (equivalent spherical diameter corresponding to 50% of the volume of all the particles, read on the cumulative distribution curve relating volume % to the diameter of the particles—often referred to as the "D(v,0.5)" value). Particle size may be measured by electron microscope, coulter counter, sedimentation analysis and static or dynamic light scattering. Techniques based on laser light diffraction are preferred.

Styrene-(Meth)acrylic resin dispersion (or styrene-(meth)acrylic dispersion). These are dispersions (also referred to as emulsions and latexes) of homopolymers and copolymers of any blend of styrene, styrene-derivative, methacrylate and acrylate monomers. Although referred to as styrene-(meth)acrylic resin dispersions it should be understood that these materials may be essentially free of any styrene or styrene derivative (i.e. wherein preferably at least 90 wt %, preferably at least 95 wt %, preferably at least 99 wt % of the resin is constituted by monomers other than styrene and/or styrene derivatives) or indeed composed largely of styrene and styrene derivatives (i.e. wherein preferably at least 40 wt %, preferably at least 60 wt %, preferably at least 80 wt % of the resin is constituted by monomers of styrene and/or styrene derivatives). The dispersions are commonly prepared by emulsion polymerization, using any blend of anionic and non-ionic surfactants; surfactant-free dispersions are also covered by the invention. It is preferred that the Tg of the styrene-(meth)acrylic dispersion is greater than 40° C., preferably greater than 60° C. and most preferably greater than 80° C. A further embodiment of the invention is that the Tg of the styrene-(methacrylic) resin dispersion should be greater than that of the PUD. The invention also covers the use of core-shell styrene-(meth)acrylic resin dispersions where the resin particles are heterophasic in nature with two or more discrete polymer phases. If a core-shell styrene-(meth)acrylic resin dispersion is used, then at least one of the phases would preferably have a Tg according to the requirements outlined above.

Hydroxy Value (OHV). This is defined as the number of milligrams of potassium hydroxide required to neutralize the acetic acid taken up on acetylation of one gram of a chemical substance that contains free hydroxyl groups. The hydroxy value can be measured according to the following procedure. The resin is dissolved in solvent, a known amount of acetic anhydride is added and then the solution is heated to achieve acetylation between the hydroxy groups of the resin and acetic anhydride. The free acid is then titrated with KOH solution and the hydroxy value is determined by using the difference between a blank of solvent and anhydride and the acetylated resin solution.

Acid Value (AV). The mass of potassium hydroxide (KOH) in milligrams that is required to neutralize one gram of chemical substance. The acid value can be measured according to the following procedure. The resin is dried and then dissolved in toluene/methanol. Using phenolphthalein as the indicator the resin solution is titrated with 0.1N KOH solution in methanol.

Nanoscale. In the context of the invention this refers to a particle having one dimension of less than 100 nm, a commonly accepted definition of a nanoparticle. For colloidal silicas (and aluminas) this means that the average particle size is preferably less than 100 nm, although particle sizes of less than 50 nm are preferred.

Unless stated otherwise, the viscosities of the inks were measured using a Brookfield DV-II+ Pro Viscometer equipped with Spindle no. 18, 100 rpm, 32° C. The inkjet compositions according to the present invention preferably have a viscosity of no more than 20 mPa·s at application temperature (i.e. 32° C.), and more preferably no more than 10 mPa·s at 32° C.

The invention describes aqueous inkjet compositions comprising a composite vehicle resin wherein the composite resin vehicle component comprises a thermoplastic polyurethane dispersion with a Tg of less than 80° C. The composite resin vehicle component of the inventive compositions further comprises either a styrene-(meth)acrylic resin dispersion or a nano-dispersion of metal oxide, where the metal oxide dispersion is most preferably a colloidal silica. Where styrene-(meth)acrylic resin dispersions are used they should preferably have a Tg of greater than 40° C., more preferably greater than 60° C. and most preferably greater than 80° C. It is preferred that the Tg of the styrene-(meth)acrylic dispersion should be greater than that of the PUD. The composite resin vehicle imbues the inventive aqueous inkjet compositions of the invention with a desirable blend of properties. Thus, the flexibility, adhesion, and ink resolubility associated with the PUD is enhanced by the inclusion of the second component with respect to its block resistance, in particular. Other performance improvements that may accrue from the composite resin vehicle are enhancements to the abrasion, rub, and scratch resistance compared with PUD-only based inks.

There is no restriction on the nature of the PUD used to prepare the composite resin vehicle of the invention. In a preferred embodiment, the inks comprising the PUD are able to produce flexible films after printing. Both anionic and non-ionically stabilized PUDs are encompassed by the invention as are aromatic and aliphatic PUDs. A further aspect of the invention is that the average particle size of the PUDs should preferably be less than 500 nm and more preferably less than 200 nm. The invention further encompasses PUDs with average molecular weights of greater than 2500 and more preferably of 5000 and greater. The invention also encompasses those PUDs having acid values (of the dry resin) of 10 mgKOH/g, or greater and also PUDs having hydroxy values of 10 mgKOH/g or greater.

The PUDs may contain one or more monomers selected from toluene diisocyanate (TDI), methylene diphenyl diisocyanate (MDI), hexamethylene diisocyanate (HDI), methylene dicyclohexyl diisocyanate, hydrogenated MDI (HMDI), isophorone diisocyanate (IPDI)) polyester diols, polyether diols, polycarbonate diols. Preferably, the PUD may contain the diol dimethylolpropionic acid monomer. It is believed that the diol dimethylolpropionic acid monomer introduces carboxylic acid groups into the polyurethane, which when neutralised provide anionic stabilisation of the PUD dispersion.

There are a variety of commercially available PUDs that can be used in the invention including, for example, those sold under the trademarks Neorez (DSM), Bayhydrol (Covestro), Sancure (Lubrizol), Syntegra (Dow), Luplen (BASF), Beetafin (BIP) and Daotan (Allnex). It should be appreciated by those skilled in the art that any thermoplastic PUD meeting the requirements of the invention may be used in the preparation of aqueous inkjet compositions of the current invention.

Without going into detail of their manufacture, the invention also encompasses aromatic and aliphatic PUDs and further encompasses PUDs produced from polyether diols, polyester diols, polyacrylic diols and polycarbonate diols or any blend or hybrid thereof. As previously stated, the PUDs may be anionic or non-ionic in terms of their stabilization, or a combination of the two stabilization mechanisms. Anionic PUDs are commonly produced by the inclusion of a carboxylic acid into the polymer structure of the PUD for example by the urethane reaction of dimethylol propionic acid ('DMPA'). Where DMPA, or other acid-containing species, is incorporated into the PUD backbone then it may be neutralized with any organic or inorganic base to enable the anionic stabilizing mechanism. These various resin types may, where applicable, be neutralized using organic bases, including, but not limited to, ammonia, triethylamine, triethanolamine, triisopropanolamine, dimethyl aminoethanol, N-methyldiethanolamine or arginine. Alternatively, they may be neutralised by an inorganic base including but not limited to alkali metal oxides, alkali metal hydroxides or alkali metal carbonates, with sodium hydroxide or potassium hydroxide being the preferred inorganic bases.

There is no limitation on the selection of the styrene-(meth)acrylic resin dispersion where it is used as the second component of the composite resin vehicle of the invention, other than that it meets the criteria previously laid out. However, it is preferable that the average particle size of the styrene-(meth)acrylic resin dispersion should be less than 500 nm and most preferably less than 200 nm. The styrene-(meth)acrylic resin dispersion may be anionically or non-ionically stabilised or use a combination of the two stabilisation mechanisms. Core-shell styrene-(meth)acrylic resin dispersions are encompassed by the invention as are cross-linked styrene-(meth)acrylic resin dispersions. The latter type of dispersion is produced by the introduction of a di-, or higher functional, monomer during the emulsion polymerisation of the dispersion. As mentioned previously, it is preferred that the Tg of the styrene-(meth)acrylic resin dispersion be greater than 40° C., preferably greater than 60° C. and most preferably greater than 80° C. A further embodiment of the invention is that the Tg of any styrene-(meth)acrylic resin dispersion forming part of the second component of the composite resin vehicle of the invention is preferably greater than that of any PUD, or blend of PUDs, comprising the first component of the composite resin vehicle. Furthermore, it is preferable that the difference in Tgs between the PUD and styrene-(meth)acrylic resin dispersion should preferably be at least 20° C. or greater, preferably 30° C. and most preferably 40° C. or greater.

The styrene-(meth)acrylic resins may comprise one or more monomers selected from styrene, methyl styrene, methyl (meth)acrylate, ethyl (meth)acrylate, butyl (meth)acrylate, ethylhexyl (meth)acrylate, hydroxy ethyl (meth)acrylate, hydroxy (propyl) methacrylate, (meth)acrylic acid and acrylonitrile. Preferably, the styrene-(meth)acrylic resins contain one or more monomers selected from styrene, alpha-methyl styrene and methyl (meth)acrylate.

Suitable styrene-(meth)acrylic resin dispersions are widely available commercially and include, for example, those sold under the trade names Joncryl (BASF), Revacryl (Synthomer), Hycar (Lubrizol), Neocryl (DSM), Neboplast (Necarbo), and the Picassian AC range (Picassian Polymers). It should be understood that this is not a limiting list and those skilled in the art should appreciate that any other styrene-(meth)acrylic resin dispersion meeting the requirements previously laid out could be used.

There is no limit on the ratio of the PUD of the first component of the composite resin vehicle and the styrene-(meth)acrylic resin dispersion of the second component of the composite resin vehicle. The ratio (by dry solid weight) of PUD to styrene-(meth)acrylic resin dispersion should preferably be in the range 20:1 to 1:5 and more preferably in the range 10:1 to 1:3. There is no limit on the total amount of PUD and styrene-(meth)acrylic resin dispersion used to prepare aqueous inkjet compositions of the invention. However, it is preferred that at least 1% (w/w), more preferably at least 2% (w/w) and most preferably at least 4% (w/w) by dry polymer weight of PUD and styrene-(meth)acrylic resin combined is used to prepare inkjet ink compositions of the invention.

Where a metal oxide nanoparticle dispersion is used as part of the second component of the composite resin vehicle, as previously mentioned it should preferably have an average particle size of less than 200 nm, preferably less than 100 nm and most preferably less than 50 nm. Especially preferred nanoparticulate dispersions are colloidal silicas. Colloidal silicas are broadly available and include those sold under the trade names Bindzil (Akzo), Ludox (Grace), Snowtex (Nissan Chemical) and Klebosol (Merck). The invention also covers the use of organically modified colloidal silicas such as those supplied by Akzo (under the Bindzil CC tradename). The invention also covers the use of other metal oxide nanoparticle dispersions including alumina, such as those sold under the tradenames Nanoarc (Nanophase) and Nanobyk (Byk).

Where a colloidal silica (or alumina) is used as part of the second component of the composite resin vehicle of the invention it may be anionically or non-ionically stabilised. There is no limit on the ratio of the PUD of the first component of the composite resin vehicle and the colloidal silica (or other metal oxide nanoparticle dispersion) of the second component of the composite resin vehicle. The ratio (by dry solid weight) of PUD to colloidal silica (or other metal oxide nanoparticle dispersion) should preferably be in the range 20:1 to 1:2 and more preferably in the range 10:1 to 1:1. There is no limit on the total amount of PUD and colloidal silica (or other metal oxide nanoparticle dispersion) used to prepare aqueous inkjet compositions of the invention. However, it is preferred that at least 1% (w/w), more preferably at least 2% (w/w) and most preferably at least 4% (w/w) by dry polymer weight of PUD and colloidal silica (or other metal oxide nanoparticle dispersion) combined is used to prepare inkjet ink compositions of the invention.

Preferably, the total dispersion content (i.e. the combined amount of PUD and styrene-(meth)acrylic resin dispersion and/or metal oxide nanoparticle dispersion) in the inkjet compositions according to the invention is from about 5% to about 30%. Preferably, the solid content of each of the styrene-(meth)acrylic dispersion, the metal oxide nanoparticle dispersion and the polyurethane dispersion is in the range of 30 to 50% (w/w). Therefore, the dry solids content (derived from these dispersions) of the ink composition is preferably in the range of from about 1.5% to about 15.0% (w/w). Preferably, the dry solid resin content of the ink composition is in the range of from about 1.5% to about 15.0% (w/w).

The foregoing describes the key components of the aqueous inkjet compositions prepared according to the invention. It should be understood that a number of other elements can be included in the inkjet composition, including solvents, pigment dispersions, surfactants, additives, etc., as is conventional in the art.

The ink composition according to the present invention includes water. This would preferably not contain ionic impurities and is therefore preferably ion-exchanged or distilled water. The quantity of water used according to the present invention, including that which is supplied as part of raw materials used, is preferably 20 to 80%, more preferably 30 to 70% by mass according to the entire ink composition.

The inks also may contain one or more water-compatible organic solvents, preferably at a level of between 1 and 40% by mass according to the entire ink composition. Examples of suitable solvents may preferably include those which are not highly flammable or volatile, typically a polyol, an alkylene glycol, an alkylene glycol ether or ether acetate type, with the following non-limiting examples: 4-hydroxy-4-methyl-2-pentanone, diethyelene glycol, diethylene glycol butyl ether, diethylene glycol ethyl ether, diethylene glycol methyl ether, diethylene glycol monoethyl ether acetate, diethylene glycol monopropyl ether, dipropylene glycol, dipropylene glycol ethyl ether, dipropylene glycol methyl ether, ethylene glycol butyl ether, ethylene glycol ethyl ether, ethylene glycol isopropyl ether, ethylene glycol methyl ether, ethylene glycol propyl ether, glycerine carbonate, N-methyl 2-pyrrolidone, glycerol, propylene glycol, propylene glycol ethyl ether, propylene glycol ethyl ether acetate, propylene glycol methyl ether, propylene glycol n-propyl ether, triethylene glycol, triethylene glycol butyl ether, triethylene glycol methyl ether, tripropylene glycol, tripropylene glycol methyl ether, N-methyl pyrollidone, urea, and the like.

Since the products of the current invention are primarily water-based in nature, it is also preferable to include a biocide or anti-mold agent. Suitable examples include products based on the following biocide structural types: benzisothiazolinone, bromo-nitro-propane-diol, isothiazolinone, ethylenedioxydimethanol, or iodo-propynyl butyl carbamate, which are marketed under the trade names Intercide (Akcros Chemicals) or Nipacide (Clariant). Other types of biocide that could be considered include sodium dehydroacetate (Geogard 111S from Lonza), sodium benzoate (Vancide 51 from R. T. VANDERBILT), sodium pyridinethiol-1-oxide (Sodium Omadine from Arch Chemicals), sodium salt of o-phenylphenol (Dowicide A from DOW Chemical) and ethyl p-hydroxybenzoate (Nipastat Sodium from Aako). These are preferably used at an amount of 0.01 to 1.00% by mass in the ink composition.

Defoamers can also optionally be included in the formulation; these prevent the formation of foam during manufacture of the ink and also while jetting. Defoamers are particularly important with recirculating printheads. Examples of suitable defoamers include TEGO FOAMEX N, FOAMEX 1488, 1495, 3062, 7447, 800, 8030, 805, 8050, 810, 815N, 822, 825, 830, 831, 835, 840, 842, 843, 845, 855, 860, and 883, TEGO FOAMEX K3, TEGO FOAMEX K7/K8 and TEGO TWIN 4000 available from Evonik. Available from BYK are BYK-066N, 088, 055, 057, 1790, 020, BYK-A530, 067A, and BYK 354. The additives DC62, DC65, DC68, DC71 and DC74 are available from Dow Corning. Agitan 120, 150, 160, 271, 290, 298, 299, 350, 351, 731, 760, 761, and 777 are available from Munzing. Surfynol 104PA, AD01, DF-110, DF-58, DF-62, DF-66, DF-695, DF-70, and MD-20 are available from Air Products.

Surface control additives are often optionally used to control the surface tension of the ink, which is required to adjust the wetting on the face plate of the printhead, and also to give the desired drop spread on the substrate, or, in the case of multi pass inkjet printing, wet on dry drop spread. They can also be used to control the level of slip and scratch resistance of the coating. Examples of suitable surface control additives include but are not limited to TEGO FLOW 300, 370, and 425, TEGO GLIDE 100, 110, 130, 406, 410, 411, 415, 420, 432, 435, 440, 482, A115, and B1484, TEGO GLIDE ZG 400, TEGO RAD 2010, 2011, 2100, 2200N, 2250, 2300, 2500, 2600, 2650, and 2700, TEGO TWIN 4000 and 4100, TEGO WET 240, 250, 260, 265, 270, 280, 500, 505, and 510 and TEGO WET KL245, all available from Evonik. Available from BYK are BYK 333 and 337, BYK UV 3500, BYK 378, 347 and 361, BYK UV 3530 and 3570, CERAFLOUR 998 and 996, NANOBYK 3601, 3610, and 3650, and CERMAT 258. Available from Cytec are EBECRYL 350 and 1360, MODAFLOW 9200, and EBECRYL 341. From Sartomer the aliphatic silicone acrylate CN9800 may be used. Surfynol 104, 420, 440, 465, 485, 61, 82, and 2502 are available from Air Products. Multiwet BD, EF, SU, SO, and VE are available from Croda. Capstone FS-30, 31, 34, 35, 50, 51, 60, 61, 63, 64, 65, and 3100 are available from Du Pont.

Included in the ink formulation can optionally be a suitable de-aerator. These prevent the formation of air inclusions and pinholes in the cured coating. These also reduce rectified diffusion, which can cause reliability issues in the printhead. Examples include the following products available from Evonik: TEGO AIREX 900, 910, 916, 920, 931, 936, 940, 944, 945, 950, 962, 980, and 986.

The ink compositions of the present invention may optionally contain one or more colorants, including pigments and/or dyes. Examples of suitable organic or inorganic pigments include carbon black, zinc oxide, titanium dioxide, phthalocyanine, anthraquinones, perylenes, carbazoles, monoazo and disazobenzimidazoles, rhodamines, indigoids, quinacridones, diazopyranthrones, dinitroanilines, pyrazoles, diazopyranthrones, pyrazoles, dianisidines, pyranthrones, tetracholoroisoindolines, dioxazines, monoazoacrylides and anthrapyrimidines. The dyes include but are not limited to azo dyes, anthraquinone dyes, xanthene dyes, azine dyes, combinations thereof and the like.

Commercial organic pigments classified according to Color Index International may be used, including, but not limited to, those according to the following trade designations: blue pigments PB1, PB15, PB15:1, PB15:2, PB15:3, PB15:4, PB15:6, PB16, PB60; brown pigments PB5, PB23, and PB265; green pigments PG1, PG7, PG10 and PG36; yellow pigments PY3, PY14, PY16, PY17, PY24, PY65, PY73, PY74 PY83, PY95, PY97, PY108, PY109, PY110, PY113, PY128, PY129, PY138, PY139, PY150, PY151, PY154, PY156, PY175, PY180 and PY213; orange pigments PO5, PO15, PO16, PO31, PO34, PO36, PO43, PO48, PO51, PO60, PO61 and PO71; red pigments PR4, PR5, PR7, PR9, PR22, PR23, PR48, PR48:2, PR49, PR112, PR122, PR123, PR149, PR166, PR168, PR170, PR177, PR179, PR190, PR202, PR206, PR207, PR224 and PR254: violet pigments PV19, PV23, PV32, PV37 and PV42; black pigments PBk1, PBk6, PBk7, PBk8, PBk9, PBk10, PBk11, PBk12, PBk13, PBk14, PBk17, PBk18, PBk19, PBk22, PBk23, PBk24, PBk25, PBk26, PBk27, PBk28, PBk29, PBk30, PBk31, PBk32, PBk33, PBk34, PBk35, NBk1, NBk2, NBk3, NBk4, NBk6; combinations thereof, and the like.

The pigments are milled to typically less than 1 micrometer after milling with a preferred particle size distribution of 10-500 nm, more preferably 10-350 nm to have better transparency and a wide color gamut.

In order to incorporate the above-described pigments to the inventive compositions, it is preferable that the pigments are manufactured and stably stored as a pigment concentrate in water. This is typically achieved by dispersing the pigment into a water-soluble or water-dispersible resin using a water-soluble and/or a water-dispersible surfactant which introduces hydrophilic functional groups into the surface of the pigment particles. Examples of these dispersing resins are numerous and could include polyvinyl alcohols, polyacrylic acid, acrylic acid-acrylonitrile copolymers, vinyl acetate-acrylate copolymers, acrylic acid-acrylate copolymers, styrene-acrylic acid copolymers, styrene-methacrylic acid copolymers, styrene-methacrylic acid-acrylate copolymers, styrene-alpha methyl styrene-acrylic acid copolymers, styrene-alpha methyl styrene-acrylic acid-acrylate copolymers, styrene-maleic acid copolymers, styrene-maleic anhydride copolymers, vinyl naphthalene-acrylic acid copolymers, vinyl naphthalene-maleic acid copolymers, vinyl acetate-maleate copolymers, vinyl acetate-crotonic acid copolymers, and vinyl acetate-acrylic acid copolymers, and the salts thereof. The copolymers can be used in any form of random copolymer, block copolymer, alternating copolymer and graft copolymer. Examples of such resins include Joncryl 67, 678, 8500, 586, 611, 680, 682, 683 and 69 available from BASF. Examples of the salts include sodium hydroxide, potassium hydroxide and salts of basic compounds such as ammonia, ethylamine, diethanolamine, triethanolamine, propylamine, isopropylamine, dipropylamine, butylamine, isobutyl amine, diethanolamine, triethanolamine, triisopropanolamine, dimethyl ethanolamine, amino methyl propanol, and morpholine. The amount of the basic compound is not strictly limited as long as the resin dispersant is equal to or more than the neutralization equivalent.

Examples of these surfactants used for the pigment dispersion include anionic surfactants such as alkane sulphonates, alpha-olefin sulphonates, alkyl benzene sulphonates, alkyl naphthalene sulphonates, acyl methyl taurinates, dialkyl sulfosuccinates, alkyl sulfates, sulfurized olefins, polyoxyethylene alkyl ether phosphates, polycarboxylic acids and mono glycerol phosphate, amphoteric surfactants such as alkylpyridinium salts and non-ionic surfactants such as polyoxyethylene alkyl ethers, polyoxyethylene alkyl phenyl ethers, polyoxyethylene alkyl esters, polyoxyethylene alkyl amides, glycerol alkyl esters and sorbitan alkyl esters. Examples include EFKA 1000, 4000, 5000 and 6000 series products from BASF, Tamol series products from Dow, and Solsperse 27,000, 40,000, 44,000, 46,000 and 47,000 from Lubrizol.

As previously mentioned, the inkjet compositions of the current invention are suitable for printing by either multipass or single-pass operations. The applications that are covered by the invention include the multipass printing of graphics, such as the printing of coated paperstock for posters, vinyl, acrylic, polystyrene, polycarbonate, polyester, poly(olefin) and the like, the multipass printing of textiles, especially of cotton-rich fabrics, the single-pass printing of textiles, the multipass printing of packaging, including cartonboard, the single pass printing of packaging, including corrugated, cartonboard and flexible packaging. The inkjet compositions of the current invention when used to print plastic and flexible packaging, including food packaging, are suitable for the printing of LDPE, LLDPE, HDPE, OPP, CPP, PET, nylon, polystyrene substrates and treated and coated films thereof. In all cases the printing of inventive inkjet compositions may be preceded by the application of a print-receptive primer to the substrate to be printed. Likewise, the printed material may be subject to further operations to realize a final product, including but not limited to, over-lacquering, lamination, etc.

The invention is further described by the following numbered paragraphs:

1. Aqueous inkjet compositions comprising a composite resin vehicle wherein the composite resin vehicle comprises an aqueous thermoplastic polyurethane dispersion and one or more second aqueous dispersions wherein the one or more second aqueous dispersions are selected from the group consisting of any of a styrene-(meth)acrylic dispersion, colloidal silica, alumina dispersion, or combinations thereof.
2. The aqueous inkjet compositions according to paragraph 1, in which the aqueous polyurethane dispersion has a glass transition temperature of less than 80° C.
3. The aqueous inkjet compositions according to paragraph 2, in which the aqueous polyurethane dispersion has a glass transition temperature of less than 40° C.
4. The aqueous inkjet compositions according to any preceding paragraph, in which the average molecular weight of the aqueous polyurethane dispersion is less than 100,000.
5. The aqueous inkjet compositions according to any preceding paragraph, in which the aqueous polyurethane dispersion has a hydroxy value of 20 mgKOH/g, or greater, based on the dry polymer matter.
6. The aqueous inkjet compositions according to any preceding paragraph, in which the aqueous polyurethane dispersion has an acid value of 10 mgKOH/g, or greater, based on the dry polymer matter.
7. The aqueous inkjet compositions according to any preceding paragraph, wherein the second aqueous dispersion of the composite resin vehicle is a styrene-(meth)acrylic resin dispersion.
8. The aqueous inkjet compositions according to paragraph 7, where the styrene-(meth)acrylic resin dispersion has a glass transition temperature of greater than 40° C.
9. The aqueous inkjet compositions according to paragraph 8, where the styrene-(meth)acrylic resin dispersion has a glass transition temperature of greater than 60° C.
10. The aqueous inkjet compositions according to paragraphs 8 and 9 where the glass transition temperature of the styrene-(meth)acrylic resin dispersion is at least 20° C. greater than that of the thermoplastic polyurethane dispersion.
11. The aqueous inkjet compositions according to paragraphs 1 to 6 where the second aqueous dispersion component is a colloidal silica having an average particle size of less than 100 nm.
12. The aqueous inkjet compositions according to paragraph 11, in which the colloidal silica has an average particle size of 20 nm, or less.
13. The aqueous inkjet compositions according to any preceding paragraph, which further comprises any blend of one or more water-soluble organic co-solvents, water-miscible organic co-solvents, or a combination thereof.
14. A printed substrate comprising the composition of any one or more of paragraphs 1-13.
15. The printed substrate of paragraph 14, wherein the substrate is an uncoated or coated paper-based substrate.
16. The printed substrate of paragraph 14, wherein the substrate is a vinyl, acrylic, polyester, polyethene, polypropylene, polystyrene, polycarbonate, or nylon substrate.
17. The printed substrate of paragraph 14, wherein the substrate is a textile.
18. The printed substrate of any one of paragraphs 14-17, wherein the substrate is a food packaging substrate.

19. The printed substrate of any one of paragraphs 14-18, wherein the composition is applied via a multi-pass inkjet printing process.
20. A composition according to paragraphs 14 to 17 which is applied via a single-pass inkjet printing process.
21. A finished package comprising the composition of any one or more of paragraphs 1-13.
22. The finished package of paragraph 21, comprising a laminate.
23. The finished package of paragraph 21 or 22 that is a food package.

The present invention has been described in detail, including the preferred embodiments thereof. However, it will be appreciated that those skilled in the art, upon consideration of the present disclosure, may make modifications and/or improvements on this invention that fall within the scope and spirit of the invention.

EXAMPLES

The following examples illustrate specific aspects of the present invention and are not intended to limit the scope thereof in any respect and should not be so construed. These examples are illustrative and are not to be read as limiting the scope of the invention as it is defined by the appended claims.

To show the impact of incorporating a high Tg styrene-(meth)acrylic resin dispersion into an aqueous inkjet composition comprising a low Tg thermoplastic polyurethane dispersion, the following compositions (Table 1) were prepared. The components were added in the sequence as listed in Table 1 starting with the deionized water, with stirring between additions. After all the ink components were added the ink was stirred for a further 5 minutes using a Silverson high shear mixer. The amounts of the components in the following Tables are the w/w % amounts.

The inks were applied to 23 μm PET film using a 6 μm k-bar and dried by using a hot air drier for 20 seconds, followed by complete drying by placing the prints in an oven at 70° C. for a further 2 minutes. To show the impact of the inclusion of the high Tg styrene-acrylic latex, the prints were assessed for their scratch resistance, their face-to-back block resistance and also their face-to-face block resistance.

The scratch resistance was determined by drawing a wooden dowel across the print surface and noting any disruption to the print. A rating of 1-9 was applied, with 9 representing a fully scratch resistant print and 1 a print with very poor scratch resistance.

Face-to-back block resistance was determined by overlaying the print with an unprinted PET film, applying a pressure of 5 tonnes to the print stack for 5 minutes, then assessing the degree of print set-off to the blocking PET film. Again, a rating of 1-9 was used, with 9 representing no set-off to the blocking PET, along with no visible damage to the print surface, and 1 representing a print that severely blocks with significant print transfer. Face-to-face block resistance was determined in a similar way by placing a print in contact with a second print of the same ink and determining the degree of blocking after applying the 5 tonnes pressure. The prints were also assessed for their flexibility, as high Tg resin binders in inks can lead to prints with poor flexibility. This is reflected in Table 1 through a rating system ascribed to the print flexibility, again with a score of 1 representing very poor flexibility with significant cracking and a score of 9 representing a print having excellent flexibility with no significant observable cracks after flexing the print.

TABLE 1

| PUD Acrylic Hybrids Demonstrating Improved Resistance Properties | | | | | | | |
| --- | --- | --- | --- | --- | --- | --- | --- |
| | Comparative Example 1 | Comparative Example 2 | Comparative Example 3 | Inventive Example 1 | Inventive Example 2 | Inventive Example 3 | Inventive Example 4 |
| Deionized water | 34.6 | 34.6 | 34.6 | 34.6 | 34.6 | 34.6 | 34.6 |
| Propylene Glycol | 10.0 | 10.0 | 10.0 | 10.0 | 10.0 | 10.0 | 10.0 |
| Propylene glycol n-propyl ether | 10.0 | 10.0 | 10.0 | 10.0 | 10.0 | 10.0 | 10.0 |
| TEA[1] | 0.2 | 0.2 | 0.2 | 0.2 | 0.2 | 0.2 | 0.2 |
| Tegowet KL245[2] | 0.2 | 0.2 | 0.2 | 0.2 | 0.2 | 0.2 | 0.2 |
| Daotan 1262[3] | 30.0 | — | — | 15.0 | — | 25.0 | 20.0 |
| Daotan 7010[4] | — | 30.0 | — | — | 15.0 | — | — |
| Joncryl 90[5] | — | — | 30.0 | 15.0 | 15.0 | 5.0 | 10.0 |
| Diamond D71C[6] | 15.0 | 15.0 | 15.0 | 15.0 | 15.0 | 15.0 | 15.0 |
| Total | 100.0 | 100.0 | 100.0 | 100.0 | 100.0 | 100.0 | 100.0 |
| Viscosity at 32° C. (mPa · s) | 3.69 | 5.01 | 5.97 | 7.38 | 5.25 | 4.08 | 5.64 |
| pH | 8.35 | 8.40 | 8.65 | 8.40 | 8.55 | 8.40 | 8.50 |
| Scratch Resistance | 3 | 3 | 5 | 7 | 7 | 3 | 3 |
| Face-to-Back Block Resistance | 5 | 9 | 9 | 9 | 9 | 7 | 9 |
| Face-to-Face Block Resistance | 1 | 1 | 9 | 9 | 9 | 7 | 9 |
| Flexibility | 9 | 9 | 3 | 9 | 9 | 9 | 9 |

Notes to Table 1:
[1]TEA: Triethanolamine
[2]Tegowet KL245: Polyether siloxane Copolymer, ex. Tego
[3]Daotan 1262: A polyurethane dispersion, ex. Allnex, with a reported Tg of −20° C.
[4]Daotan 7010: A polyurethane dispersion, ex. Allnex, with a reported Tg of 30° C.
[5]Joncryl 90: A styrene-acrylic dispersion, ex. BASF, with a reported Tg of 110° C.
[6]Diamond D71C: A cyan (PB15:3) dispersion, ex. Diamond, with a solid content of 16% (w/w)

The results in Table 1 show that the introduction of the high Tg styrene-acrylic latex, Joncryl 90, produced significant improvements in the scratch and block resistance of the PUD-based inks. This was achieved without any observable loss of flexibility or adhesion of the dried inks. Comparative Example 3, based solely on Joncryl 90 as the binder, although showing excellent block resistance was found to have poor flexibility, with significant cracking of the print when flexed. All the PUD-containing inks produced prints with excellent flexibility showing very few signs of cracking when flexed.

To show the impact of the Tg of the second component of the composite vehicle, a series of inks comprising Daotan 1262 were prepared in a similar fashion to Inventive Example 1, but using styrene-acrylic and acrylic dispersions of differing Tg's. The compositions and test results for these inks are provided in Table 2.

TABLE 2

The Impact of the Glass Transition Temperature of the Second Component of the Composite Resin Vehicle

|  | Comparative Example 1 | Inventive Example 1 | Inventive Example 5 | Inventive Example 6 | Inventive Example 7 | Comparative Example 4 | Comparative Example 5 |
|---|---|---|---|---|---|---|---|
| Deionized water | 34.6 | 34.6 | 34.6 | 34.6 | 34.6 | 34.6 | 34.6 |
| Propylene Glycol | 10.0 | 10.0 | 10.0 | 10.0 | 10.0 | 10.0 | 10.0 |
| Propylene glycol n-propyl ether | 10.0 | 10.0 | 10.0 | 10.0 | 10.0 | 10.0 | 10.0 |
| TEA | 0.2 | 0.2 | 0.2 | 0.2 | 0.2 | 0.2 | 0.2 |
| Tegowet KL245 | 0.2 | 0.2 | 0.2 | 0.2 | 0.2 | 0.2 | 0.2 |
| Daotan 1262 | 30.0 | 15.0 | 15.0 | 15.0 | 15.0 | 15.0 | 15.0 |
| Joncryl 90 | — | 15.0 | — | — | — | — | — |
| Joncryl 1158[1] | — | — | 15.0 | — | — | — | — |
| Joncryl 538[2] | — | — | — | 15.0 | — | — | — |
| Joncryl 2178[3] | — | — | — | — | 15.0 | — | — |
| Joncryl 77[4] | — | — | — | — | — | 15.0 | — |
| Joncryl 617[5] | — | — | — | — | — | — | 15.0 |
| Diamond D71C | 15.0 | 15.0 | 15.0 | 15.0 | 15.0 | 15.0 | 15.0 |
| Total | 100 | 100 | 100 | 100 | 100 | 100 | 100 |
| Viscosity at 32° C. (mPa · s) | 3.69 | 7.38 | 10.8 | 6.12 | 4.38 | 6.45 | 6.93 |
| pH | 8.35 | 8.40 | 8.5 | 8.15 | 8.50 | 8.50 | 8.50 |
| Scratch Resistance | 3 | 7 | 7 | 7 | 3 | 3 | 3 |
| Face-to-Back Block Resistance | 5 | 9 | 9 | 9 | 9 | 7 | 5 |
| Face-to-Face Block Resistance | 1 | 9 | 9 | 7 | 1 | 1 | 1 |
| Flexibility | 9 | 9 | 9 | 9 | 9 | 9 | 9 |

Notes to Table 2:
[1]Joncryl 1158: An acrylic dispersion, ex. BASF, with a reported Tg of 103° C.
[2]Joncryl 538: An acrylic dispersion, ex. BASF, with a reported Tg of 64° C.
[3]Joncryl 2178: An acrylic dispersion, ex. BASF, with a reported Tg of 42° C.
[4]Joncryl 77: An acrylic dispersion, ex. BASF, with a reported Tg of 35° C.
[5]Joncryl 617: An acrylic dispersion, ex. BASF, with a reported Tg of 7° C.

The results in Table 2 clearly show the impact that the Tg of the second component of the composite resin vehicle of the invention has on the resistance properties of the PUD-based aqueous inkjet compositions. Joncryl 90 and Joncryl 1158 with their Tg's of greater than 100° C. produce inks with excellent block resistance, whilst maintaining the flexibility provided by the PUD. Joncryl 538, having a Tg of 64° C. (Inventive Example 6) enhances the block resistance properties, but a slight fall-off in the face-to-face block resistance was observed. Joncryl 2178, with a Tg of 42° C., although enhancing the face-to-back block resistance does not promote the face-to-face block resistance. As the Tg of the second component reduces further to 35 and 7° C. of Comparative Examples 4 and 5 there is minimal or no enhancement to the scratch and block resistance of the prints, thereby supporting the claims of the invention.

Based on these findings, a further set of aqueous inkjet compositions were prepared where the composite resin vehicle was comprised of a flexible PUD (Daotan 7010) but using a colloidal silica rather than a high Tg acrylic dispersion as the second component. In the examples shown in Table 3, Bindzil 30/360, ex. EKA Chemicals, was used—this is an anionic colloidal silica with a solids content of 30% (w/w) and an average particle size of less than 100 nm.

TABLE 3

Composite Resin Vehicles comprising Colloidal Silica

|  | Comparative Example 2 | Inventive Example 8 | Inventive Example 9 | Inventive Example 10 |
|---|---|---|---|---|
| Deionized water | 34.6 | 32.9 | 31.3 | 29.6 |
| Propylene Glycol | 10.0 | 10.0 | 10.0 | 10.0 |
| Propylene glycol n-propyl ether | 10.0 | 10.0 | 10.0 | 10.0 |
| TEA | 0.2 | 0.2 | 0.2 | 0.2 |
| Tegowet KL245 | 0.2 | 0.2 | 0.2 | 0.2 |
| Daotan 7010 | 30.0 | 25.0 | 20.0 | 15.0 |
| Bindzil 30/360 | — | 6.7 | 13.3 | 20.0 |
| Diamond D71C | 15.0 | 15.0 | 15.0 | 15.0 |
| Total | 100.0 | 100.0 | 100.0 | 100.0 |
| Viscosity at 32° C. (mPa · s) | 5.01 | 4.77 | 4.44 | 4.17 |

TABLE 3-continued

Composite Resin Vehicles comprising Colloidal Silica

|  | Comparative Example 2 | Inventive Example 8 | Inventive Example 9 | Inventive Example 10 |
|---|---|---|---|---|
| pH | 8.40 | 8.80 | 9.10 | 9.50 |
| Scratch Resistance | 3 | 3 | 5 | 7 |
| Face-to-Back Block Resistance | 9 | 9 | 9 | 9 |
| Face-to-Face Block Resistance | 1 | 7 | 9 | 9 |
| Flexibility | 9 | 9 | 9 | 9 |

The results presented in Table 3 demonstrate that the composite resin vehicle of the current invention can also be formed by the combination of a thermoplastic PUD and a suitable nanoscale inorganic metal oxide dispersion, in this case colloidal silica.

To demonstrate how the invention can be used in the preparation of aqueous inkjet compositions for the graphics printing of posters, the inks according to Table 4 were prepared and tested for the following; drying speed, wet rub resistance, face-to-back block resistance. For each assessment, the ink was applied to uncoated offset paper at using a 6 μm k-bar.

The viscosities of the inks were measured using a Brookfield DV-II+ Pro Viscometer equipped with Spindle no. 18, 100 rpm, 32° C.

Drying time was determined at 70° C. and a rating of 1-5 was given whereby 5 represents a drying speed of <1 min and 1 represents >10 min, for the print to become dry to the touch.

Wet rub resistance was determined by applying 5 rubs using a cotton bud wetted with deionized water with a rating of 1-5 given whereby 5 represents no removal of ink and 1 represents total removal of ink.

Face-to-back block resistance was assessed by overlaying the dried print with uncoated offset paper such that the non-print side is in contact with the dried ink film before applying 5 tonnes pressure for 15 sec. A rating of 1-5 was given whereby 5 represents no transfer of ink and 1 represents significant transfer of ink.

TABLE 4

PUD-Acrylic Hybrids Demonstrating Improved Resistance Properties for Inkjet Ink Poster Applications

|  | Comparative Example 6 | Comparative Example 7 | Inventive Example 11 |
|---|---|---|---|
| Solvent blend (deionized water, glycols, biocide, surfactant) | 72.84 | 69.62 | 71.46 |
| Triethanolamine | 0.50 | 0.50 | 0.50 |
| Proprietary Cyan Pigment Dispersion | 17.00 | 17.00 | 17.00 |
| Joncryl 90 | 9.66 | — | 5.52 |
| Neorez R600 | — | 12.88 | 5.52 |
| Total | 100 | 100 | 100 |
| Viscosity at 32° C. (mPa · s) | 5.14 | 5.46 | 5.30 |
| pH | 8.73 | 8.66 | 8.72 |
| Drying Speed at 70° C. | 3 | 5 | 5 |
| Wet Rub Resistance | 3 | 5 | 5 |
| Face-to-Back Block Resistance | 4 | 1 | 4 |
| Flexibility | 2 | 5 | 5 |

The results in Table 4 show that Comparative Example 3, containing Joncryl 90 alone, achieves good face-to-back block performance but poor drying speed and inadequate wet rub resistance. Comparative Example 5, containing Neorez R600 alone, suffers poor face-to-back block resistance but excellent drying speed and wet rub resistance. Inventive Example 11, containing a 1:1 ratio of Joncryl 90 and Neorex R600, combines acceptable block resistance with excellent drying speed and wet rub resistance. Inventive Example 11 has been successfully, and reliably, jetted from a Kyocera KJ4A printhead with an open time of greater than 30 minutes, no nozzle dropout and no start-up issues.

The invention claimed is:

1. Aqueous inkjet composition comprising a composite resin vehicle wherein the composite resin vehicle comprises an aqueous thermoplastic polyurethane dispersion and one or more second aqueous dispersion(s), wherein the one or more second aqueous dispersion(s) are selected from the group consisting of a styrene-(meth)acrylic resin dispersion, a metal oxide nanoparticle dispersion, and a combination thereof, wherein the average particle size of the styrene-(meth)acrylic resin dispersion is less than 500 nm, wherein the styrene-(meth)acrylic resin dispersion has a glass transition temperature of greater than 40° C., wherein the average particle size of the metal oxide nanoparticle dispersion is less than 200 nm, and wherein the aqueous inkjet composition further comprises one or more colorant(s).

2. The aqueous inkjet composition according to claim 1, wherein the aqueous polyurethane dispersion has a glass transition temperature of less than 80° C.

3. The aqueous inkjet composition according to claim 2, wherein the aqueous polyurethane dispersion has a glass transition temperature of less than 40° C.

4. The aqueous inkjet composition according to claim 1, wherein the average molecular weight of the aqueous polyurethane dispersion is less than 100,000.

5. The aqueous inkjet composition according to claim 1, wherein the aqueous polyurethane dispersion has a hydroxy value of 20 mgKOH/g, or greater, based on the dry polymer matter (i.e. the dry weight of the polyurethane).

6. The aqueous inkjet composition according to claim 1, wherein the aqueous polyurethane dispersion has an acid value of 10 mgKOH/g, or greater, based on the dry polymer matter (i.e. the dry weight of the polyurethane).

7. The aqueous inkjet composition according to claim 1, wherein the one or more second aqueous dispersion(s) of the resin composite vehicle is a styrene-(meth)acrylic resin dispersion.

8. The aqueous inkjet composition according to claim 1, where the styrene-(meth)acrylic resin dispersion has a glass transition temperature of greater than 60° C.

9. The aqueous inkjet composition according to claim 1, wherein the glass transition temperature of the styrene-(meth)acrylic resin dispersion is at least 20° C. greater than that of the thermoplastic polyurethane dispersion.

10. The aqueous inkjet composition according to claim 1, wherein the one or more second aqueous dispersion(s) is a metal oxide nanoparticle dispersion.

11. The aqueous inkjet composition according to claim 10, wherein the second aqueous dispersion component is a colloidal silica having an average particle size of less than 100 nm.

12. The aqueous inkjet composition according to claim 11, wherein the colloidal silica has an average particle size of 20 nm or less.

13. The aqueous inkjet composition according to claim 1, which further comprises any blend of one or more water-soluble organic co-solvents, water-miscible organic co-solvents, or a combination thereof.

14. The aqueous inkjet composition according to claim 1, wherein water is present in an amount of 20 to 80%, by mass relative to the entire ink composition.

15. The aqueous inkjet composition according to claim 1, wherein the one or more colorant(s) comprises a pigment, a dye or a combination thereof.

16. A printed substrate comprising the composition of claim 1.

17. The printed substrate of claim 16, wherein the substrate is an uncoated or coated paper-based substrate.

18. The printed substrate of claim 16, wherein the substrate is a translucent paper-based substrate.

19. The printed substrate of claim 16, wherein the substrate is a vinyl, acrylic, polyester, polyethene, polypropylene, polystyrene, polycarbonate, or nylon substrate.

20. The printed substrate of claim 16, wherein the substrate is a textile.

21. The printed substrate of claim 16, wherein the substrate is a food packaging substrate.

22. The printed substrate of claim 16, wherein the composition is applied via a multi-pass inkjet printing process.

23. The printed substrate of claim 16, wherein the composition is applied via a single-pass inkjet printing process.

24. A finished package comprising the composition of claim 1.

25. The finished package of claim 24, comprising a laminate.

26. The finished package of claim 24 that is a food package.

27. A method for improving block and rub resistance of an aqueous inkjet composition comprising an aqueous thermoplastic polyurethane dispersion, the method comprising blending said aqueous thermoplastic polyurethane dispersion with one or more aqueous dispersion(s) selected from the group consisting of a styrene-(meth)acrylic resin dispersion(s), a metal oxide nanoparticle dispersion(s) and a combination thereof, wherein the styrene-(meth)acrylic resin dispersion has a glass transition temperature of greater than 40° C. to provide an improved rub and block resistant aqueous inkjet composition comprising a composite resin vehicle wherein the composite resin vehicle comprises an aqueous thermoplastic polyurethane dispersion and one or more second aqueous dispersion(s).

28. The method according to claim 27 wherein the improved rub and block resistant aqueous inkjet composition comprises a composite resin vehicle wherein the composite resin vehicle comprises an aqueous thermoplastic polyurethane dispersion and one or more second aqueous dispersion(s), wherein the one or more second aqueous dispersion(s) are selected from the group consisting of a styrene-(meth)acrylic resin dispersion, a metal oxide nanoparticle dispersion, and a combination thereof, wherein the average particle size of the styrene-(meth)acrylic resin dispersion is less than 500 nm, wherein the styrene-(meth)acrylic resin dispersion has a glass transition temperature of greater than 40° C., wherein the average particle size of the metal oxide nanoparticle dispersion is less than 200 nm, and wherein the improved rub and block resistant aqueous inkjet composition further comprises one or more colorant(s).

* * * * *